US008612640B2

(12) United States Patent
Kishita

(10) Patent No.: US 8,612,640 B2
(45) Date of Patent: Dec. 17, 2013

(54) CONTROL APPARATUS, CONTROL METHOD AND COMPUTER PROGRAM

(75) Inventor: Yuri Kishita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 501 days.

(21) Appl. No.: 13/054,904

(22) PCT Filed: Jul. 29, 2009

(86) PCT No.: PCT/JP2009/003580
§ 371 (c)(1),
(2), (4) Date: Jan. 19, 2011

(87) PCT Pub. No.: WO2010/013459
PCT Pub. Date: Feb. 4, 2010

(65) Prior Publication Data
US 2011/0126218 A1    May 26, 2011

(30) Foreign Application Priority Data

Jul. 30, 2008   (JP) ................................ 2008-196520

(51) Int. Cl.
*G06F 3/00*    (2006.01)
*G06F 5/00*    (2006.01)

(52) U.S. Cl.
USPC .............................................. 710/15; 710/36

(58) Field of Classification Search
None
See application file for complete search history.

(56) References Cited

U.S. PATENT DOCUMENTS

| 6,574,734 | B1 * | 6/2003 | Colson et al. .................... 726/21 |
| 2001/0025216 | A1 | 9/2001 | Nishimura et al. |
| 2004/0128037 | A1 | 7/2004 | Miyamoto et al. |
| 2006/0111825 | A1 | 5/2006 | Okada et al. |
| 2006/0212178 | A1 | 9/2006 | Yoshimura et al. |
| 2008/0068144 | A1 | 3/2008 | Sato |
| 2008/0282248 | A1 * | 11/2008 | Tokumochi et al. .......... 718/102 |

FOREIGN PATENT DOCUMENTS

| JP | A-2001-101146 | 4/2001 |
| JP | A-2001-270399 | 10/2001 |
| JP | A-2004-192541 | 7/2004 |
| JP | A-2006-18853 | 1/2006 |
| JP | A-2006-142994 | 6/2006 |
| JP | A-2006-257998 | 9/2006 |
| JP | A-2006-260404 | 9/2006 |

(Continued)

OTHER PUBLICATIONS

Takada; "Device Driver no Jisso;" *TECH I Real-Time OS to Kumikomi Gijutsu no Kiso*; Jul. 1, 2003; pp. 141-168; vol. 17 (with partial translation).

(Continued)

*Primary Examiner* — Kris Rhu
(74) *Attorney, Agent, or Firm* — Oliff & Berridge, PLC

(57) ABSTRACT

Functions of platform layer based on platform program are separated into a resource manager layer that performs logical controls for hardware resources and a resource controller layer that performs physical controls for the hardware resources. The resource manager layer requires identifying a desired data based on an application program, but does not require knowing the actual address of the desired data in a storing unit. The resource controller layer knows the actual address, and physically reads out and replies the data instructed by the resource controller layer.

20 Claims, 3 Drawing Sheets

(56) References Cited

FOREIGN PATENT DOCUMENTS

| | | |
|---|---|---|
| JP | A-2006-327216 | 12/2006 |
| JP | A-2007-128432 | 5/2007 |
| JP | A-2007-329578 | 12/2007 |
| JP | A-2008-74124 | 4/2008 |

OTHER PUBLICATIONS

International Search Report dated Sep. 1, 2009 in corresponding International Application No. PCT/JP2009/003580 (with translation).

* cited by examiner

CONTROL APPARATUS, CONTROL METHOD AND COMPUTER PROGRAM

This application is the national phase under 35 U.S.C.§371 of PCT International Application No. PCT/JP2009/003580 which has an International filing date of Jul. 29, 2009 and designated the United States of America.

BACKGROUND OF THE INVENTION

1. Field of the Invention

The present invention relates to a control apparatus utilizing an application program and a platform program. Especially, the present invention relates to a control apparatus, a control method and a computer program, which implement utilizing a part of platform program for overcoming the difference of hardware resources, implement improving the reusability, implement shortening the development process and implement reducing the development load.

2. Description of Related Art

Recently, several fields adopt a system where plural control apparatuses are connected to exchange data with each other, each of which is provided with a communication function, and a functional role is assigned to each control apparatus. Such the system can make the plural control apparatuses associate with each other and then perform several processes. For example, in a field of on-vehicle local area network (LAN) arranged on a vehicle, an electronic control unit (ECU; electronic control apparatus) is provided with such the communication function, each of ECUs implements assigned functional role and exchanges data to another ECU, and then the system can perform several processes (e.g., patent document 1).

In the case that plural control apparatuses are associated with each other and performs several processes, each control apparatus can be configured to implement an assigned functional role similar to the assigned function of another control apparatus and said another control apparatus may substitute for the control apparatus based on the setting for implementing the assigned functional role of the control apparatus, instead of focusing on the specialization of the assigned functional role of each control apparatus. Particularly, it may be configured to separate a common function from an application program that implements the functional role assigned to each control apparatus, respectively, and configured to implement the separated common function with utilizing a platform program. For example, the common function consists of storing or updating data utilized for executing the application program, communicating with another apparatus, or the like.

When a definition of communication specifications is changed in such the configuration, the platform program may be changed and then each control apparatus may be made to execute the changed platform program. On the contrary, it is not required to change the application program in accordance with the change of communication specifications. Even with the unchanged application program, it is possible to communicate with another control apparatus with performing the process similar to the process performed before the change of application program. Thus, it does not require complicated works, such as the preparation of plural kinds of application programs based on the difference of definition of communication specifcations. The application program may be configured just for implementing the assigned functional role, and then the reusability of application program is improved better.

[Patent Document 1] Japanese Patent Application Laid-Open No. 2007-329578

SUMMARY OF THE INVENTION

The configuration of platform program differs in accordance with the difference of hardware resource. As an ECU includes a storage device, it is considered that the storage device may be, for example, an EEPROM or a flash memory. Actual physical processes are different between for the EEPROM and for the flash memory. However, the important thing is to actually write desired data into such the storage device, and it is not important about which physical process is actually performed.

In the case that it is necessary to change the platform program in accordance with the type of configurations or specifications of hardware resource, the reusability of platform program is decreased. Furthermore, it is hard to improve the complex works of development process required for the control apparatus itself and it is hard to improve the complex works of development process required for the large-scale system utilizing plural control apparatuses that have different hardware resources, respectively. Thus, it is hard to shorten the development process and to reduce the development load.

The present invention is made in view of such circumstances, and has an object to provide a control apparatus, a control method, and a computer program, which implement separating the functions of platform program into a functional part for logically controlling the hardware resources and a functional part for physically controlling the hardware resources based on the type of the hardware resources, implement improving the reusability of the platform program, implement shortening the development process and implement reducing the development load.

A control apparatus of a first aspect according to the present invention has a first executing means for executing one or more application programs and a second executing means for executing a platform program to control a hardware resource in accordance with a request from the application programs, wherein the second executing means comprises: an indicating means for indicating to obtain information from the hardware resource in accordance with the request from the application program or for indicating the hardware resources to perform an operation; and a controlling means for controlling data input into or output from the hardware resources in accordance with a content indicated by the indicating means, and the controlling means comprises a plurality of function implementing means.

A control apparatus of a second aspect according to the present invention has one of the function implementing means that comprises: a means for determining whether or not there is a hardware resource corresponding to the indicated operation, and a means for emulating the operation of the hardware resource and responding to the indicating means, when it is determined that there is not the hardware resource corresponding to the indicated operation.

A control apparatus of a third aspect according to the present invention further comprises: a means for detecting an indication of application program to be executed by the first executing means, an indication to be executed by the indicating means and the controlling means of the second executing means, or executing conditions of the application program and implementing conditions of each function through the first and second executing means.

A control method of a fourth aspect according to the present invention is for controlling hardware resources, with executing one or more application programs and executing a platform program, which controls the hardware resources, in accordance with a request from the application program, and comprises steps of: indicating the hardware resources to obtain information or the hardware resources to perform an operation in accordance with the request from the application program, and controlling data input into and output from the hardware resources, which are performed independently from each other by a process of the plat form program, and further controlling the data input into and output from the hardware resources, which are based on the respective hardware resources and performed independently from each other by a process of the plat form program.

A computer program of a fifth aspect according to the present invention is for making a computer control an operation of hardware resource in accordance with a request from an application program when the computer executes one or more application programs, wherein plural computer parts are included which are separated by predetermined functional units, and each computer part makes the computer respectively implement: a function for indicating to obtain information from the hardware resource in accordance with a request from the application program, or for indicating the hardware resource to perform an operation; and a function for controlling data input into and output from the hardware resource.

In the first aspect, the fourth aspect and the fifth aspect, two means are independently provided, one of the means is for performing a logical access, such as instruction for obtaining information from a hardware resource in accordance with a request from an application program or instruction for making the hardware resource perform an operation, and the other of the means is for performing a physical access that controls input into and output from the hardware resource, such as actual access to an I/O memory of the hardware resource. The type difference of hardware resources is addressed by the functional part which performs the physical access. It is possible input and output desired data, although another functional part performing the logical access does not require to recognize the type of hardware resource and the physical part of hardware resource performing the data input and the data output.

Furthermore, at least the means for performing the physical access is configured to include a functional module that implements a function independently. Thus, it is possible to select and combine functional modules based on the type of hardware resources and the desired specifications. Therefore, it is not required to change whole of the platform program itself based on the type of hardware resources.

In the second aspect, the function for implementing the physical access contributes in emulating the operation of hardware resource when there is no hardware resource corresponding to the request from the application program which indicates to perform an operation, and thus the response is replied as if there is the hardware resource corresponding to the request. Hence, the functional part for implementing the logical access can respond to the request from the application program which indicates to perform the operation, regardless of the presence of corresponding hardware resource. Therefore, it is not required to particularly change whole of the platform program in accordance with the individual specifications of hardware resource.

In the third aspect, it is further possible to change the function implemented by the application program and the platform program, in accordance with several conditions of whole of the control apparatus. Furthermore, the situations of respective programs can be detected by the corresponding executing means, and thus it is possible to select the control function of hardware resources in accordance with the conditions executing the application program.

According to the present invention, the platform program is configured with the functional part for implementing the logical access and another functional part for implementing the physical access. These functional parts are separated from each other, and the functional part for implementing the logical access is configured to be independent from the physical handle of hardware resource. Thus, it is not required to particularly change the whole of platform program in accordance with the individual specifications of hardware resource. Only the functional part for implementing the physical access may be changed in accordance with the type of hardware resource. It is possible to improve the reusability, since the functional part for implementing the logical access can be shared by several hardware resources. Therefore, it is possible to shorten the development process and reduce the development load.

BRIEF DESCRIPTION OF THE DRAWINGS

The above and further objects and features of the invention will more fully be apparent from the following detailed description with accompanying drawings.

DESCRIPTION OF THE PREFERRED EMBODIMENTS

Hereinafter, an embodiment of the present invention is described in detail with reference to drawings.

In the embodiment described below, a control apparatus according to the present invention is described in the context of an electronic control unit (ECU), which is mounted on a car and performs several controls, in reference to a control system where plural ECUs are connected to associate with each other via communication line and perform processes.

Figure 1:
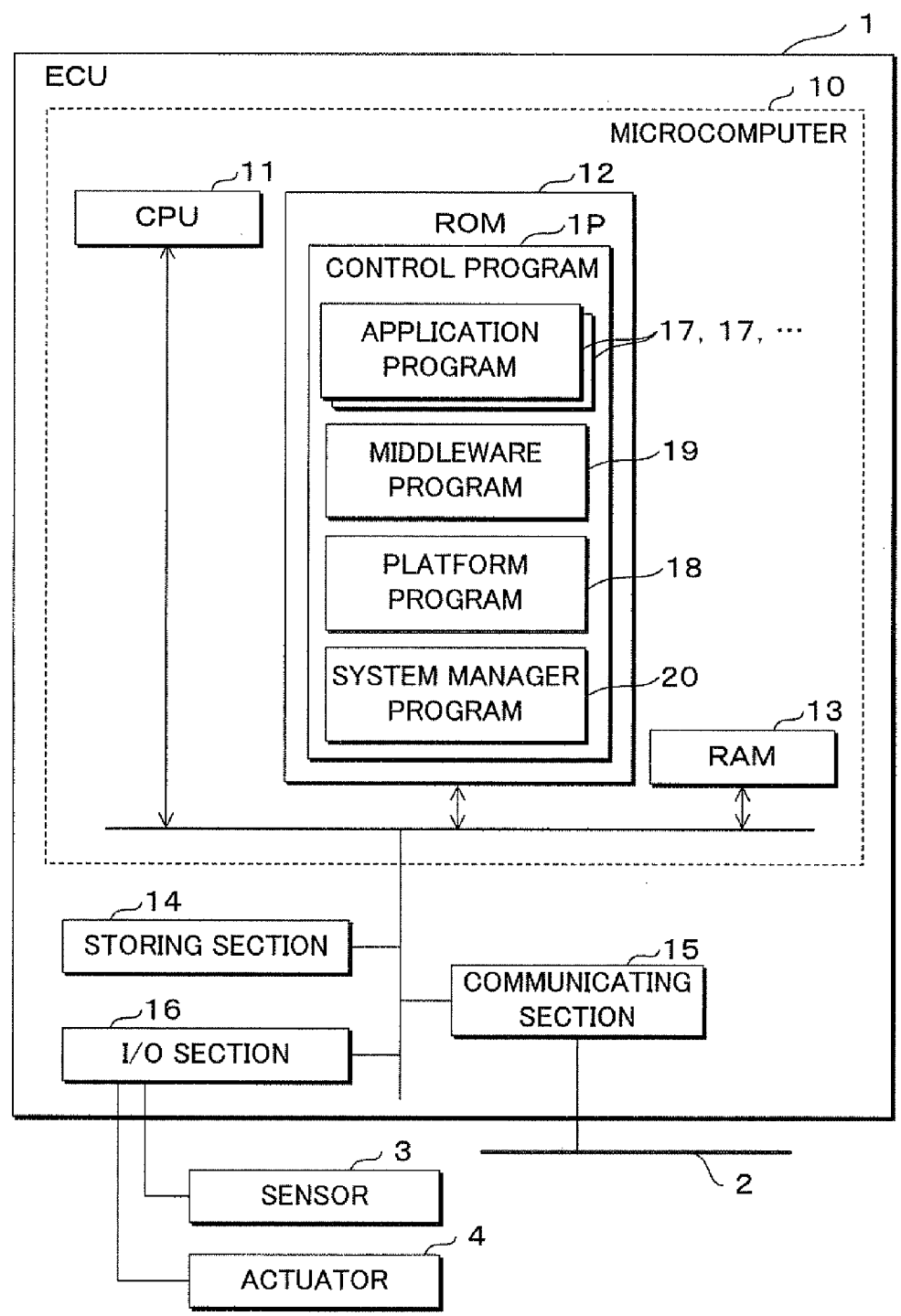
FIG. 1 is a block diagram showing a configuration of an ECU according to the present embodiment.

FIG. 1 is a block diagram showing a configuration of the ECU according to the present embodiment. The ECU 1 is connected to another ECU via a communication line 2 and is configured to be able to communicate with another ECU. The ECU 1 is additionally connected to a sensor 3 and an actuator 4. The ECU 1 is provided with a specific function, such as a function for operating the actuator 4 based on the information obtained through the process performed by the ECU 1 in accordance with the information obtained from the sensor 3 or operating the actuator 4 based on the information obtained through the process performed by another ECU. Although the ECU 1 is connected both to the sensor 3 and to the actuator 4, the ECU 1 may be alternatively connected to any one of both or connected to none of both.

The ECU 1 includes a central processing unit (CPU) 11 that controls operations of each component, a ROM 12 configured with a non-volatile memory, a microcomputer 10 provided with a RAM 13 which implements high speed access, a storing unit 14 configured with a non-volatile memory, a communicating unit 15 configured with a network controller, and an I/O unit 16 which is an interface for the sensor 3 and the actuator 4.

The storing unit 14 is a memory having a relatively large storage capacity, such as a flash memory and an electrically erasable and programmable ROM (EEPROM). The storing unit 14 stores information obtained through the process performed by the microcomputer 10 executing application programs 17, 17, which is described later. The stored information is system information, such as condition information of the ECU 1 and condition information of vehicle mounting the ECU 1. Additionally, the storing unit 14 stores data obtained from the sensor 3 by the microcomputer 10, data received from another ECU and the like.

The communicating unit 15 implements the communication with another ECU which is performed through the communication line 2 by the microcomputer 10. The communicating unit 15 particularly implements the communication based on a protocol of control area network (CAN), a protocol of local interconnect network (LIN), a protocol of Flex Ray (registered trademark) or the like. The communicating unit 15 may be configured as a part of microcomputer 10, alternatively.

The I/O unit 16 is the interface for the sensor 3 and the actuator 4, as described above. In the case of connecting to the sensor 3, the I/O unit 16 acquires a signal representing, for example, a measured value output from the sensor 3, and then outputs the signal to the microcomputer 10. In the case of connecting to the actuator 4, the I/O unit 16 outputs a control signal to the actuator 4, as the control signal is required for the actuator 4 and output by the microcomputer 10. The I/O unit 16 may be provided with a function for the D/A conversion and A/D conversion.

The central processing unit (CPU) 11 of microcomputer 10 implements a specific function that controls each component through reading out a control program 1P stored in the ROM 12 onto the RAM 13 and executing the read control program 1P.

The ROM 12 is a memory, such as a mask ROM, a flash memory, a programmable ROM (PROM), an erasable and programmable ROM (EPROM), or an electrically EPROM (EEPROM). Although storing the control program 1P as described above, the ROM 12 may further store control data utilized for controlling.

The RAM 13 is a memory, such as a dynamic random access memory (DRAM) or a static random access memory (SRAM). The RAM 13 is configured to temporally store respective information that are generated through the process performed by the CPU 11.

The control program 1P stored in the ROM 12 is configured to include: application programs 17, 17, . . . for making the microcomputer 10 perform a process specific to the ECU 1; a platform program 18 for implementing a function common with another ECU, such as a controlling function of hardware resource and a communicating function; a middleware program 19 for mediating the application programs 17, 17, . . . and the platform program 18; and a system manager program 20 for controlling whole of the ECU 1 in order to perform a process based on each program.

The application programs 17, 17, . . . include several programs for making the ECU 1 implement the specific function, such as a program for implementing a control process of engine mounted on the car, and a program for implementing a switch process of door lock ON/OFF and of head light ON/OFF.

The platform program 18 includes a program for implementing a process performed by each hardware resource in accordance with an operation request sent from the microcomputer 10 to each hardware resource based on the application programs 17, 17, . . . , such as a process of writing data into the storing unit 14, a process of reading out data from the storing unit 14, and a process of sending data through the communicating unit 15. Particularly, the platform program 18 includes: a resource manager part corresponding to a device driver for implementing a logical data access based on the operation request sent from the CPU 11 executing the application programs 17, 17, . . . ; and a resource control part corresponding to a basic input/output system (BIOS) for implementing a physical data access based on the implementation of respective hardware resources.

The middleware program 19 includes a program for implementing an interpreter function, such as a program for converting the operation request sent from the application programs 17, 17, . . . to conform to the platform program 18 and then for sending the converted operation request to the platform program 18. Particularly, the middleware program 19 includes an output type process function for receiving an output request based on the application programs 17, 17, . . . from the CPU 11, for converting the received output request to conform to the platform program 18 and for sending the converted output request to the platform program 18. The output request is, for example a request to write data in the storing unit 14 or a request to send data through the communicating unit 15. Additionally, the middleware program 19 includes an input type process function for receiving data input from the platform program 18, for converting the received data to conform to the application program 17 and for sending the converted data to the application programs 17, 17, . . . . The middleware program 19 further implements a management type process function for sending management information to the application programs 17, 17, . . . . The management information is received from the CPU 11 based on a system manager program 20 described later.

The system manager program 20 is a program for adjusting whole of the processes performed by the CPU 11, such as the process based on the application programs 17, 17, . . . , the process based on the platform program 18 and the process based on the system manager program 20, in order to correspond to a situation where the ECU 1 should work properly and to control the ECU 1. For example, the system manager program 20 implements a function for changing the process performed on the basis of each program, in accordance with the difference of situations, such as a situation where the ECU 1 should perform an operation for a test phase before shipping or a situation where the ECU 1 should perform an operation during maintenance. For example, the system manager program 20 implements a function for changing the process performed on the basis of each program, in accordance with the difference of situations, such as a situation where the ECU 1 should correspond to a car utilizing Japanese specifications or a situation where the ECU 1 should correspond to a car utilizing North American specifications. For example, the system manager program 20 implements a function for changing the physical control method of hardware resource, in accordance with the performed application programs 17, 17, . . . .

Figure 2:
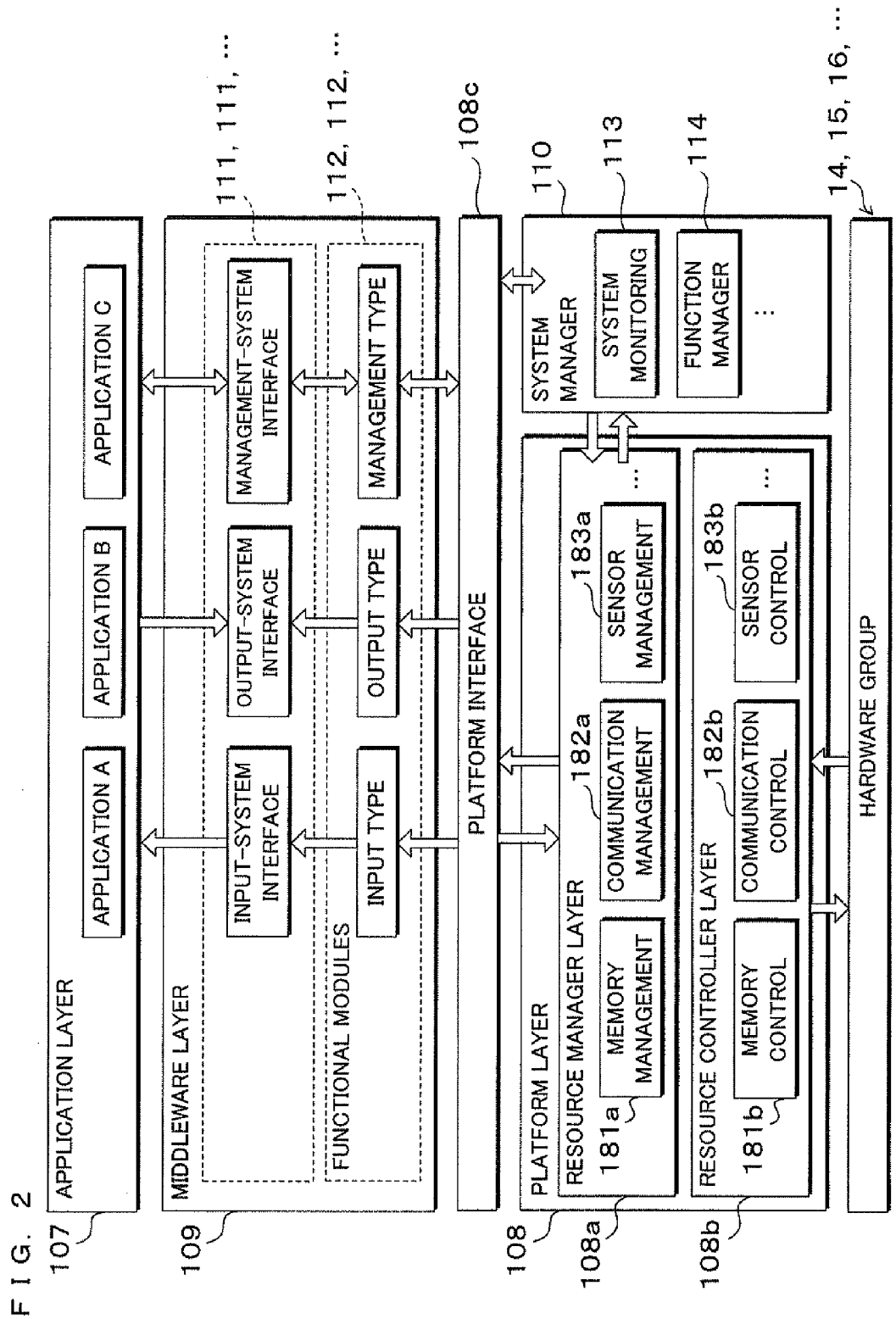
FIG. 2 is an explanation view conceptually showing a function implemented by a CPU of ECU according to the present embodiment.

FIG. 2 is an explanation view conceptually showing a function implemented by the CPU 11 of ECU 1 according to the present embodiment. The CPU 11 reads out the control program 1P onto the RAM 13, which is stored in the ROM 12, and then executes the read control program 1P. As described above, the control program 1P includes the application programs 17, 17, . . . , the platform program 18, the middleware program 19 and the system manager program 20. The CPU 11 performs an operation with a software configuration separated into three layers based on the respective programs included in the control program 1P; an application layer 107, a middleware layer 109; and a platform layer 108.

In the uppermost application layer 107, the CPU 11 works as respective applications (application A, application B, application C, . . . ) based on the application programs 17, 17, . . . .

In the middleware layer 109, the CPU 11 implements respective functional modules 112, 112, . . . based on the middleware program 19, as the functional modules 112, 112, . . . are for receiving operation requests from respective applications in the application layer 107 or for sending data from the platform layer 108 to the application layer 107. For example, the respective functional modules 112, 112, . . . include an input type functional module 112 that sends data obtained from the platform layer 108 to the application layer 107, an output type functional module 112 that sends the output from the application layer 107, and a management type functional module that sends the management information showing an indication from the system manager 110 described later. Thus, in the middleware layer 109, interfaces 111, 111, . . . are implemented on the basis of the middleware program 19, as the interfaces 111, 111, . . . correspond to several application programs 17, 17.

In the lowermost platform layer 108, the CPU 11 actually controls a group of hardware 14, 15, 16, . . . based on the platform program 18. Several functions are implemented in the lowermost platform layer 108, for example, a function for reading and writing data with the storing unit 14, a function for transmitting data with the communicating unit 15, and the like. The platform layer 108 is further hierarchized into a resource manager layer 108a and a resource controller layer 108b. The resource manager layer 108a is configured to implement functions 181a, 182a, 183a, . . . for performing the logical access, for example, that leads indicating which data should be read out from the storing unit 14. The resource controller layer 108b is configured to implement functions 181b, 182b, 183b, . . . for performing the physical access, for example, that leads to actual writing of data to be sent into the I/O memory of communicating unit 15.

For example, a memory management function 181a is implemented in the resource manager layer 108a and a memory control function 181b is implemented in the resource controller layer 108b, for reading and writing data of memory (e.g., storing unit 14). The memory management function 181a determines, in accordance with the request from the application layer 107, which data should be read out from the memory and which data should be written into the memory. The memory control function 181b identifies the address in the memory for the determined data, actually reads out the determined data and then actually writes the determined data. Furthermore, a communication management function 182a is implemented in the resource manager layer 108a and a communication control function 182b is implemented in the resource controller layer 108b. The communication management function 182a instructs the communicating unit 15 to send data, for example. The communication control function 182b actually performs data input into and data output from the communicating unit 15. Similarly, a sensor management function 183a is implemented in the resource manager layer 108a and a sensor control function 183b is implemented in the resource controller layer 108b. The sensor management function 183a instructs to read out data obtained from the sensor. The sensor control function 183b actually receives the signal from the sensor.

It will be described below about the advantages of platform layer 108 hierarchized into the resource manager layer 108a and the resource controller layer 108b. For example, an application in the application layer 107 sends a request to read out data from the storing unit 14, and the platform layer 108 receives the operation request. It is simply required in the platform layer 108 that the resource manager layer 108a can read out the requested data from the storing unit 14 and input the read data into the application, regardless of whether the memory of storing unit 14 is the EEPROM or the flash memory. On the other hand, there are differences in the actual data reading method based on the specifications of respective hardware resources, i.e., whether the memory of storing unit 14 is the EEPROM or the flash memory. The memory control function 181b in the resource controller layer 108b modifies the read method in consideration of these differences, and sends the read data to the memory management function 181a in the resource manager layer 108a. Therefore, the memory management function 181a in the resource manager layer 108a can send the data, in response to the operation request from the application, to the application layer 107 side, regardless of memory type and the like.

It is possible to consider similarly about the case that the application sends a request for sending data from the communicating unit 15. It is simply required in the resource manager layer 108a that the requested data can be sent from the communicating unit 15 to a device, such as another ECU, regardless of whether the ECU 1 is connected to the CAN, LIN or Flex Ray. On the other hand, it is necessary to add information based on the type of protocol onto the data to be sent, when the data is actually sent from the communicating unit 15. The communication control function 182b in the resource controller layer 108b modifies the data to be sent in consideration of the protocol type. Therefore, the communication management function 182a in the resource manager layer 108a can respond to the data sending request from the application, regardless of the protocol type.

In addition, the resource controller layer 108b includes a function for performing a process based on the presence of hardware resource. Particularly, there are control functions 181b, 182b, 183b, . . . corresponding to respective hardware resources, and these control functions are respectively provided with emulator functions that emulate operations for the corresponding hardware resources and return the emulated operations to the upper layer, i.e., the resource manager layer 108a when the corresponding hardware resources is not present. For example, it is assumed that the resource manager layer 108a requests to send the data for recognizing whether the "headlight" is ON or OFF. In the case that the sensor control function 183b cannot obtain the signal for directly recognizing whether the "headlight" is ON or OFF because the "headlight" is not connected, the sensor control function 183b utilizes e.g., the information capable of obtaining from another ECU for recognizing whether the "small light" is ON or OFF, instead of the information for recognizing whether the "headlight" is ON or OFF, and sends the information about the "small light" as the information about the "headlight". The emulator functions contribute to make the resource manager layer 108a be capable of performing processes, regardless of the presence of corresponding hardware resources. Alternatively, the resource controller layer 108b includes a virtualization function independently implementing to emulate, and respective emulator functions are not included in the control functions 181b, 182b, 183b, . . . corresponding to respective hardware resources.

Respective functions in the resource controller layer 108b are affected by the type or specifications of hardware resources and by the presence of hardware resources. Thus, the respective functions in the resource controller layer 108b should be adjusted in conformity to the hardware resources.

On the other hand, the respective functions implemented in the resource manager layer 108a are configured independently of the physical access control for the hardware resources. Thus, the respective functions in the resource manager layer 108a are not affected by the type or specifications of hardware resources and by the presence of hardware resources. Therefore, it is possible to combine the resource controller layer 108b and respective functions in the resource manager layer 108a, although the resource controller layer 108b is designed in conformity to several hardware resources and the resource manager layer 108a is common to several hardware resources.

Furthermore, the CPU 11 reads out and executes the system manager program 20, and thus the function of system manager 110 is implemented with the interface shared by the platform layer 108. The system manager 110 implements a system monitoring function 113 that detects conditions of three layers, operation conditions of respective applications in the application layer 107, operation conditions of functional modules 112, 112, . . . in the middleware layer 109 which correspond to the operating application and then that keeps the information, and implements a function management function 114 that identifies the type, shipping destination and grade of car on which the ECU 1 should be mounted, the application, functional module, operated hardware resource implemented in each layer corresponding to the change of ECU 1 function, and the like. It is noted that the system manager 110 is not limited to the configuration shown in FIG. 2 where the interface is shared with the platform layer 108. Alternatively, the system manager 110 may be configured to directly transmit information with the functions of respective layers.

An example of applications implemented in the application layer 107 is a signal control, condition judgment, load control that controls loads (such as an actuator 4) or the like. Respective application programs 17, 17, . . . executed in the application layer 107 are determined in accordance with the management information sent from the system manager 110 through the management type functional module in the middleware layer 109. For example, the CPU 11 reads out the management information from the middleware layer 109 in accordance with the application program 17 executed by the application layer 107, selects another of application programs 17, 17, . . . to be executed in accordance with the read management information, and executes the selected application program. The management information includes, for example, information showing conditions or situations of ECU 1, and information for identifying the application programs 17, 17, . . . to be executed in accordance with the conditions or situations of ECU 1. For example, the management information includes information showing that the ECU 1 is in the test phase before shipping and information for identifying the application programs 17, 17, . . . to be executed in the case that the ECU 1 is in the test phase before shipping. Thus, the application layer 107 can select and execute a proper application program 17 based on the management information. Therefore, it is possible to perform proper processes based on the situations.

An example of functional modules 112, 112, . . . in the middleware layer 109 is an input type relay function that relays information obtained from the platform layer 108 into the application in the application layer 107. In the input type relay function, the CPU 11 sends the information required by the application in the application layer 107, among the information obtained from the platform layer 108. In addition, there is an output type relay function that relays the data output from the application of the application layer 107 into the platform layer 108. In the output type relay function, the CPU 11 selects an output destination in the platform layer 108 for the information output from the application in the application layer 107, in accordance with the intended use of this output information, selects a proper interface from the platform interface 108c and sends the output information to the selected interface.

For example, when the information output from the application is data to be sent to an external apparatus, the function of output type module 112 corresponding to the platform layer 108 selects a proper interface from the platform interface 108c in order to send the data from the communication hardware corresponding to the proper protocol. Thus, the destination of sent data is selected. For example, when the information output from the application is data to be input into the storing unit 14, the function of output type module 112 selects a proper interface in order to access to the storing unit 14.

Figure 3:
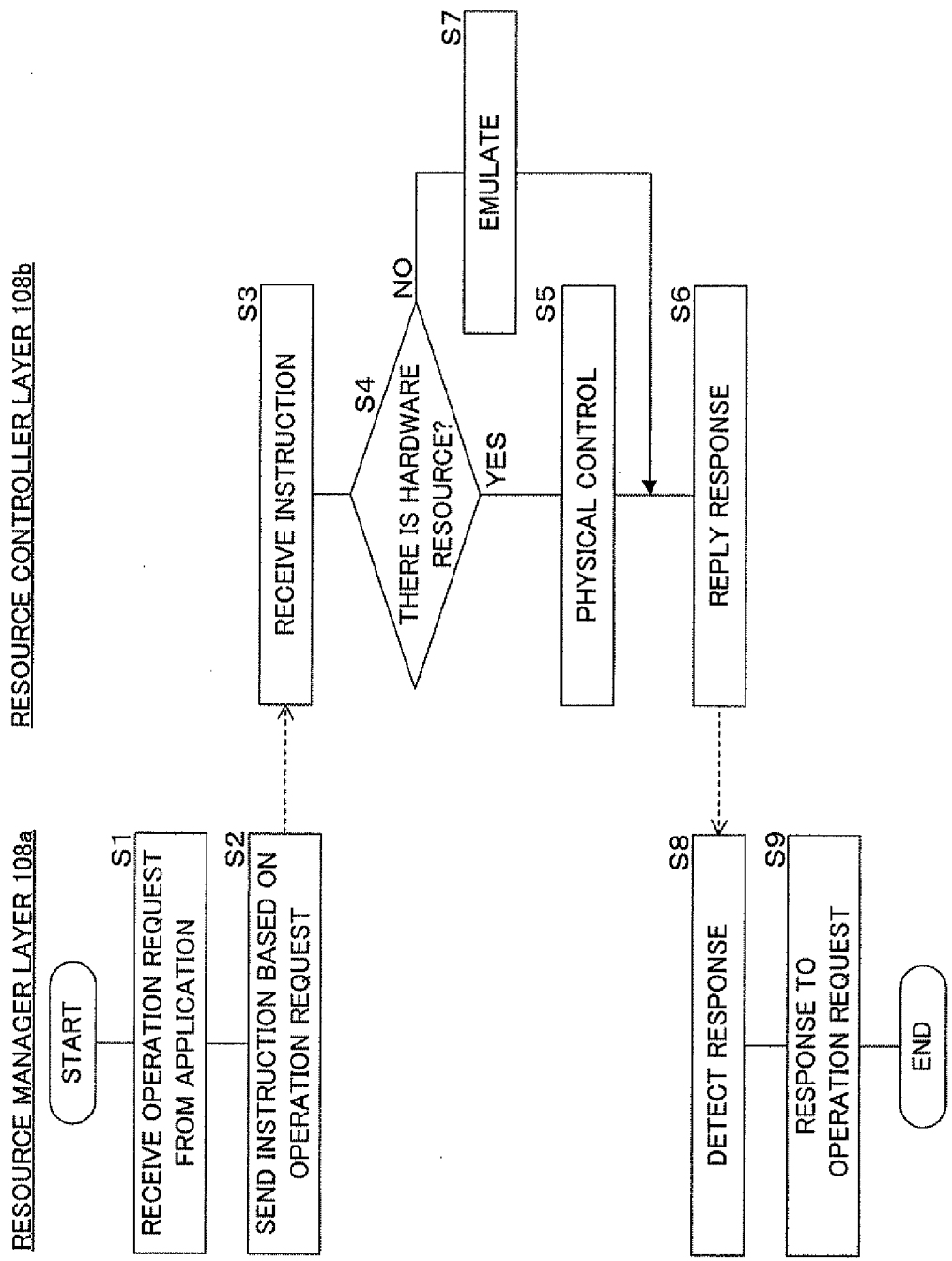
FIG. 3 is a flowchart showing an example of process performed by a resource manager layer and a resource controller layer in accordance with an operation request.

FIG. 3 is a flowchart showing an example of process performed by the resource manager layer 108a and the resource controller layer 108b in accordance with the operation request.

The middleware layer 109 selects a function, as an output destination, among the functions in the resource manager layer 108a. The selected function receives an operation request from the application in application layer 107 (step S1). A function in resource manager layer 108a generates an instruction based on the operation request and sends the generated instruction to the resource controller layer 108b (step S2). In the case that the application requests to read out data, the memory management function in the resource manager layer 108a described above identifies the data to be read out and instructs the resource controller layer 108b to read out the identified data.

A function in the resource controller layer 108b receives the instruction from the resource manager layer 108a (step S3), determines whether there is a hardware resource based on the instruction or not (step S4). When having determined that such the hardware resource is not there (S4: YES), the physical control for the hardware resource is performed in accordance with the instruction (step S5), and the response is returned (step S6). In the example case of memory control function 181b described above, the storing unit 14 is directly instructed to read out the data based on the identified data address, the data is read out from the I/O memory of the storing unit, and the like.

When having determined that there is not the hardware resource (S4: NO), the operation is emulated (step S7) and the response is returned (S6). In the example case of memory control function 181b described above, the communicating unit 15 may receive the instruction when there is no memory storing the identified data. Then, the communicating unit 15 may return data temporary stored in the communicating unit 15 as the data to be read out. In the example case of sensor control function 183b, the communicating unit 15 may return data received by the communicating unit 15 as the data sent from the sensor, when there is no sensor to which the data based on the read-out instruction should be output. Therefore, it looks like as if there is the connected sensor.

The resource manager layer 108a detects the response from the resource controller layer 108b (step S8), and returns the detected response to the application from which the operation request has been sent (step S9). Then, the procedure is completed.

As described above, the platform layer 108 is configured with the resource manager layer 108a and the resource controller layer 108b which are separated and work independently from each other. Based on the platform program 18 of control program 1P included in the ECU 1 according to the present embodiment, the resource manager layer 108*a* implements the function for the logical access and the resource controller layer 108*b* implements the function for the physical access which is affected by the type of hardware resource. Thus, the resource manager layer 108*a* can implement the function, regardless of the types or specifications of hardware resources and the presence of hardware resource. Therefore, it is not required to change the part of program corresponding to the resource manager layer 108*a* in accordance with the types, specifications and presences of hardware resources connected to the ECU 1. The part of program corresponding to the recourse controller layer 108*b* may be simply adjusted to the type of hardware resources. Since the program part corresponding to the resource manager layer 108*a* can be commonly conformed to and utilized for several hardware resources, it is possible to improve the reusability. Therefore, it is possible to obtain several advantages, such as shortening the development process and reducing the development load.

In the case that plural ECUs associate with each other and perform several processes, it might be configured to make respective ECUs utilize hardware resources having different types or specifications from each other. When the platform program 18 of each ECU must be changed in conformity to the hardware resource in that configuration, it happens to cause the complicated program management and the non-effective development. On the other hand, the configuration of platform layer 108 according to the present embodiment can contribute to utilize a common resource manager layer 108*a* even for several hardware resources having the types or specifications different from each other and connected to respective ECUs. Thus, it is possible to improve the versatility. Therefore, it is possible to obtain several advantages, such as not only shortening the development process but also preventing the complexity of program management for the large-scale development.

Furthermore, the respective control functions 181*b*, 182*b*, 183*b*, . . . of resource controller layer 108*b* can implement the emulator function when the corresponding hardware resource is not present, and thus it looks like as if the corresponding hardware resource is present. Thus, it is possible to utilize the same resource manager layer 108*a* for the case that there are differences not only in types or specifications but also in the presence of hardware resources connected to respective ECUs. Hence, it is possible to improve the versatility and reusability. Therefore, it is possible to obtain several advantages, such as shortening the development process and reducing the development load.

The embodiment described above shows an example where the present invention is applied to the ECU mounted on the vehicle. However, the present invention is not limited to that example. The present invention may be applied to several computer apparatuses that perform several controls.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control apparatus connectable to a hardware resource, comprising:
   a memory that stores an application program and a platform program; and
   a controlling unit that controls the hardware resource based on the application program, wherein
   the controlling unit is hierarchized into a logical access performing unit that performs a logical access to the hardware resource based on the platform program and a physical access performing unit that performs a physical access to the hardware resource based on the platform program.

2. A control apparatus according to claim 1, wherein
   the controlling unit sends an operation instruction based on the application program to the hardware resource, and
   the controlling unit performs inputting and outputting data based on the operation instruction.

3. A control apparatus according to claim 1, further comprising:
   a specification detecting unit that detects a specification of the hardware resource; and
   an adjusting unit that performs an adjustment on the physical access performed by the physical access performing unit, wherein
   the adjustment performed by the adjusting unit reflects the specification detected by the specification detecting unit.

4. A control apparatus according to claim 1, further comprising:
   a situation detecting unit that detects a situation of the control apparatus; and
   a adjusting unit that performs an adjustment on the physical access performed by the physical access performing unit, wherein
   the adjustment performed by the adjusting unit reflects the situation detected by the situation detecting unit.

5. A control apparatus according to claim 1, wherein the hardware resource is a sensor mounted on a vehicle.

6. A control apparatus according to claim 1, wherein the hardware resource is an actuator mounted on a vehicle.

7. A control apparatus according to claim 2, further comprising:
   a recording unit that records an object hardware for which the application program is intended; and
   a determining unit that determines whether the object hardware is identical to the hardware resource or not, wherein
   when the determining unit determines that the object hardware is not identical to the hardware resource, the controlling unit emulates an operation to be performed by the object hardware and performs inputting and outputting data relating to the emulated operation.

8. A control apparatus according to claim 2, further comprising:
   another application program; and
   a selecting unit that selects an application program among the application program stored in the memory and said another application program, wherein
   the controlling unit controls the hardware resource based on the application program selected by the selecting unit.

9. A control system having a hardware resource and plural control apparatuses which are connected through a communication line, wherein
   each control apparatus, comprising:
   a memory that stores an application program and a platform program; and
   a controlling unit that controls the hardware resource based on the application program, wherein
   the controlling unit is hierarchized into a logical access performing unit that performs a logical access to the hardware resource based on the platform program and a physical access performing unit that performs a physical access to the hardware resource based on the platform program, the controlling unit sends an operation instruction based on the application program to the hardware resource, and the controlling unit performs inputting and outputting data based on the operation instruction.

10. A control method for a control apparatus connectable to a hardware resource, comprising steps of:

storing an application program and a platform program;

performing a logical access to the hardware resource based on the stored platform program;

performing a physical access to the hardware resource based on the stored platform program; and controlling the hardware resource based on the stored application program, with utilizing the performed logical access and the performed physical access, wherein the step of performing the logical access and the step of performing the physical access are independent from each other.

11. A control method according to claim 10, further comprising steps of:

sending an operation instruction based on the application program to the hardware resource through the step of controlling; and performing to input and output data from the control apparatus based on the operation instruction.

12. A control method according to claim 10, further comprising steps of:

detecting a specification of the hardware resource; and adjusting the physical access based on the detected specification.

13. A control method according to claim 10, further comprising steps of:

detecting a situation of the control apparatus; and adjusting the physical access based on the detected situation.

14. A control method according to claim 10, wherein the hardware resource is a sensor mounted on a vehicle.

15. A control method according to claim 10, wherein the hardware resource is an actuator mounted on a vehicle.

16. A control method according to claim 11, further comprising steps of:

identifying an object hardware for which the application program is intended;

determining whether the object hardware is identical to the hardware resource or not;

emulating an operation to be performed by the object hardware, when it is determined that the object hardware is not identical to the hardware resource; and performing to input and output data relating to the emulated operation.

17. A control method according to claim 11, further comprising steps of:

preparing another application program; and selecting an application program among the stored application program and the prepared another application program, wherein the step of controlling the hardware resource utilizes the selected application program.

18. A non-transitory computer readable medium recording a computer program for controlling a control apparatus connectable to a hardware resource, wherein the computer program when executed causes a computer system to execute steps of:

storing an application program and a platform program;

performing a logical access to the hardware resource based on the stored platform program;

performing a physical access to the hardware resource based on the stored platform program; and controlling the hardware resource based on the stored application program, with utilizing the performed logical access and the performed physical access, wherein the step of performing the logical access and the step of performing the physical access are independent from each other.

19. A non-transitory computer readable medium according to claim 18, wherein the computer program when executed causes the computer system to execute further steps of:

sending an operation instruction based on the application program to the hardware resource through the step of controlling; and performing to input and output data from the control apparatus based on the operation instruction.

20. A non-transitory computer readable medium according to claim 18, wherein the computer program when executed causes the computer system to execute further steps of detecting a specification of the hardware resource; and adjusting the physical access based on the detected specification.

* * * * *